United States Patent [19]
Herwig et al.

[11] 3,875,263
[45] Apr. 1, 1975

[54] DIPHOSPHINIC ACID ESTERS AND PROCESS FOR MAKING SAME

[75] Inventors: Walter Herwig, Neuenhain, Taunus; Hans-Jerg Kleiner, Bad Soden, Taunus, both of Germany

[73] Assignee: Hoechst Aktiengesellschaft, Frankfurt/Main, Germany

[22] Filed: July 19, 1973

[21] Appl. No.: 380,743

[30] Foreign Application Priority Data
July 22, 1972 Germany............................ 2236036

[52] U.S. Cl. .............. 260/928, 260/75 P, 260/932, 260/978, 260/982
[51] Int. Cl. .............................................. C07f 9/46
[58] Field of Search ............ 260/932, 928, 978, 982

[56] References Cited
UNITED STATES PATENTS
3,372,209   3/1968   Biram et al. ......................... 260/932
3,578,731   5/1971   Mange et al. ..................... 260/928 X OTHER PUBLICATIONS
Harwood, et al., "Macromolecules," Vol. 1, No. 3, May–June, 1968, pp. 233–6.

Primary Examiner—Anton H. Sutto
Attorney, Agent, or Firm—Curtis, Morris & Safford

[57] ABSTRACT

Di-phosphinic acid esters of the formula

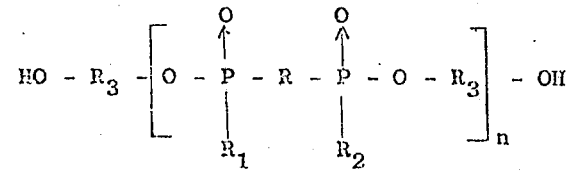

wherein R represents saturated, open-chain alkylene having from 1 to 15 carbon atoms, phenylene, biphenylene or phenylalkylene, $R_1$ and $R_2$ represent alkyl or cycloalkyl groups, as well as phenyl or benzyl and $R_3$ represents saturated, open-chain alkylene and $n$ is from 1 to 30, are described as well as suitable processes for the preparation of the di-phosphinic acid ester named and their use for flame-proofing polyesters.

7 Claims, No Drawings

DIPHOSPHINIC ACID ESTERS AND PROCESS FOR MAKING SAME

The present invention relates to diphosphinic acid esters.

It is known that phosphinic acid esters may be prepared from phosphinic acids by reacting silver salts of the corresponding phosphinic acids with alkyl halides. It has further been described that bis-cyclo-hexyl-phosphinic acid can be reacted with diazomethane to obtain the corresponding methyl ester. Finally, also the direct esterification of phosphinic acids, which carry a γ-hydroxy-alkyl group, while forming inner phosphinic acid esters, the so-called phostones is known. The processes known up to now have, however, no technical importance.

It has now been found monomeric or oligomeric diphosphinic acid esters of the formula

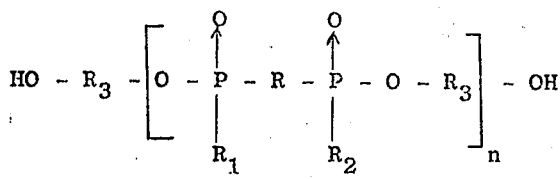

wherein R represents saturated, open-chain, optionally branched or cyclic alkylenes having from 1 to 15 carbon atoms, phenylene, biphenylene, or phenylalkylene having up to 6 carbon atoms in the alkylene radical, $R_1$ and $R_2$ represent identical or different alkyl or cycloalkyl groups having up to 6 carbon atoms, phenyl or benzyl, $R_3$ represents saturated, open-chain, optionally branched or cyclic alkylenes having from 2 to 15 carbon atoms and n is from 1 to 30, show interesting technical properties.

Di-phosphinic acid esters of this type can be prepared from di-phosphinic acids of the formula

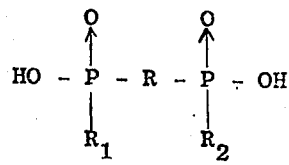

or from di-phosphinic acid esters of the formula

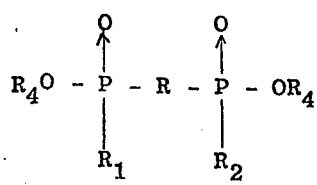

by reacting with diols of the formula

at elevated temperature, wherein R, $R_1$, $R_2$, $R_3$ have the above meanings and $R_4$ may be alkyl groups having up to 6 carbon atoms.

Especially suitable are those di-phosphinic acids or di-phosphinic acid esters, in which the radicals R, $R_1$, $R_2$ and $R_4$ have the following significance:

R represents methylene, ethylene, n-propylene, neopentylene 1,4-methylene-cyclohexane and p-xylylene, $R_1$ and $R_2$ represent methyl, ethyl, isopropyl, n-hexyl and phenyl $R_4$ represents methyl, ethyl, isobutyl.

In the diols used the radical $R_3$ is preferably ethylene butylene, hexylene or 1,4-methylene-cyclohexane.

The di-phosphinic acids used as initial products or the di-phosphinic acid esters can be prepared according to various known processes. For example they can be prepared according to an Arbusow reaction from phosphorous acid diesters and alkyl dihalides, as is described among others in U.S. Pat. No. 3.403.176. Other processes are known from J. org. Chem. 32, 1967, page 2172 et seq.

The monomeric or oligomeric, bifunctional diphosphinic acid esters of the invention are prepared by reacting a diphosphinic acid or the esters thereof with a dihydric alcohol at increased temperatures, expediently in the presence of a catalyst.

If free diphosphinic acid is used as initial product preferably one of those catalysts is used which have been proposed as ester interchange catalysts in the preparation of polyesters. They are described, for example, in the British Patent specifications 802.821 and 770.531. Especially suitable are metal salts such as manganese-(II)-acetate, zinc acetate and calcium acetate.

If diphosphinic acid esters are used as starting product preferably basic catalysts should be used. Alkali metal and alkaline earth metal alcoholates have proved especially good, for example sodium ethylate.

All the catalysts named are, in general, used in quantities of from 0.05 to 5 percent by weight, preferably in quantities of from 0.1 to 1.0 percent by weight, calculated on the phosphorus compound used.

Depending on the temperature and the duration of the reaction the phosphinic acid esters of the invention are condensed to a varying extent. In general it is recommendable to work at a reaction temperature of over 150°C, preferably of between 200° and 300°C. The reaction time should not exceed 1 hour if only a low degree of condensation is desired. A high degree of condensation can be attained with a reaction time of up to 10 hours, however, in general, the reaction does not need to be continued for longer than six hours.

If ethylene-1,2-di-(methylphosphinic acid) is heated for example in the above manner with ethylene glycol in the presence of manganese-(II)-acetate, an ethylene-1,2-di-(methylphosphinic acid ester) is obtained of the formula

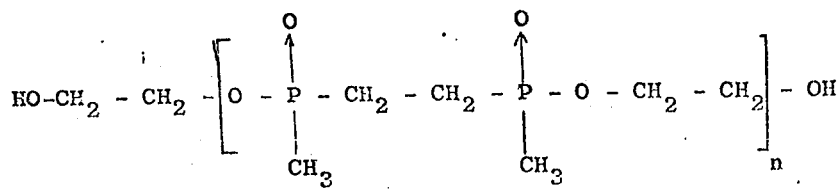

wherein n can have a value of between 1 and 30, depending on temperature and duration of reaction.

It is expedient to use an excess of ethylene glycol, to heat the reaction mixture of the boiling point of the dihydric alcohol and then to distil off excess dihydric alcohol by increased heating, optionally under reduced pressure, whereby the desired degree of condensation is obtained.

The reaction may also be carried out by using stoichiometric quantities of the initial components. The use of a solvent and dispersing agent which serves at the same time as entrainer for the dihydric alcohol or water may also be recommendable. For example, highly chlorinated aromatic substances can be used as solvents and entrainers of this type.

The esters of the invention are colorless, generally transparent solid matters and, depending on the degree of condensation, more or less high melting. They are stable in water and diluted mineral acids; in aqueous alkalis they are split to give the free phosphinic acids.

The new compounds may be used in various ways. They may be used as noncombustible high temperature baths, as softeners for polymers and as coating compounds. Furthermore, the compounds may be used in various ways as intermediary products because of their dihydric alcohol structure and they can be condensed into polyester to give fire-proof products.

The following examples illustrate the invention.

EXAMPLE 1

33.48 g of ethylene-1,2-di-(methylphosphinic acid) were mixed with 260 g of ethylene glycol and 0.12 g of manganese acetate and stirred in a glass flask for 2 hours at 240° to 250°C. The colorless, clear melt was subsequently heated in a water jet vacuum and then at high vacuum of 1 mm/Hg for three hours at 260°C. The yield was 48.6 g of a colorless clear resin. The structure

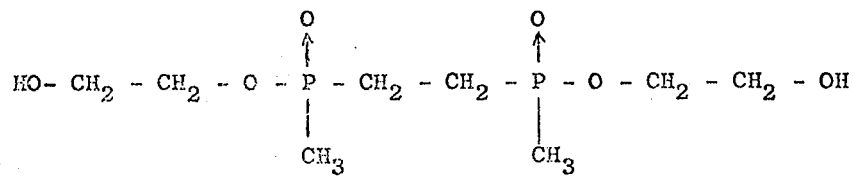

is ascertained by the following analyses.

|   | found |   | theoretical |
|---|-------|---|-------------|
| C | 35.7; | 35.4 | 35.0 |
| H | 7.3;  | 7.5  | 7.3  |
| P | 22.7; | 22.9 | 22.6 |

An aliquot portion of the compound was dissolved in water, mixed with excess 0.1 N NaOH, the solution heated for one hour at reflux and subsequently titrated with 0.1 N HCl. The sodium hydroxide solution caused quantitative splitting in glycol and ethylene-1,2-di-(methylphosphinic acid) which could be titrated sharply with sodium hydroxide solution. The titration values corresponded exactly to the formula given.

EXAMPLE 2

Example 1 was repeated with the alteration that instead of manganese acetate 0.25 g of zinc acetate were used. The same compound was obtained as specified in Example 1.

EXAMPLE 3

80.5 g of ethylene-1,2-di-(methylphosphinic acid) were heated with 620 g of ethylene glycol and 0.25 g of manganese acetate in a distilling apparatus, provided with a Vigreux column, while stirring for 3.5 hours at 240°C. 85 ml of water/glycol mixture were distilled off. Subsequently the reaction product was subjected without the column to a vacuum of less than 1 mm/Hg for 3 hours at from 240° to 250°C. The completely colorless, transparent resin was brittle at below 20°C and tough at over room temperature, without running. Only at approximately 80°C the resin became capable of flowing.

Splitting with sodium hydroxide, titration with hydrochloric acid (as in Example 1), as well as the phosphorus analysis (P found 27.1; 27.3 P theoretical 27.6) corresponded to the structure:

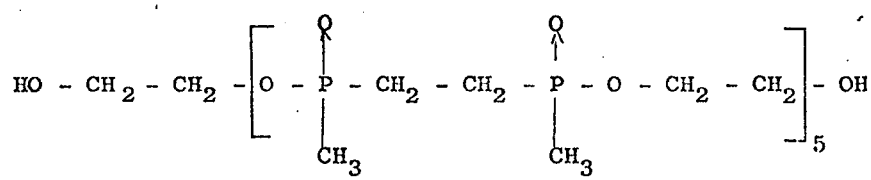

EXAMPLE 4

40 g of ethylene-1,2-di-(methylphosphinic acid-isobutylester) were mixed with 300 g of ethylene glycol and 0.2 g of sodium ethylate and heated in a distillation apparatus slowly. At a temperature of from 150° to 200° the reaction started with the splitting off of isobutanol which distilled off at 108°C. After the reaction had been completed the process was carried out as in Example 1 in order to eliminate the excess glycol. The dihydric alcohol specified in Example 1 was obtained in a quantitative yield.

What is claimed is:

1. A pure phosphinic acid ester of the formula

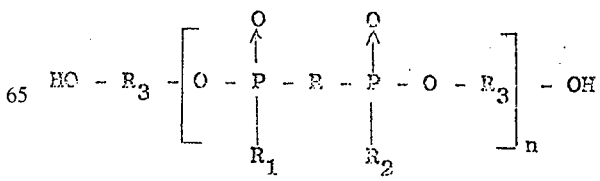

wherein R represents a saturated, open-chain, optionally branched or cyclic alkylene having from 1 to 15 carbon atoms, phenylene, biphenylene or phenylalkylene having up to 6 carbon atoms in the alkylene radical, $R_1$ and $R_2$ represent alkyl or cycloalkyl groups having up to 6 carbon atoms, phenyl or benzyl, $R_3$ represents a saturated, open-chain, optionally branched or cyclic alkylene having from 2 to 15 carbon atoms and n is from 1 to 30.

2. Process for the preparation of di-phosphinic acid esters according to claim 1, wherein a di-phosphinic acid of the formula

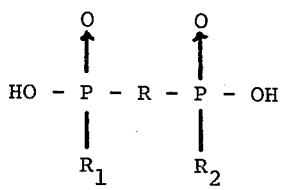

is reacted in the presence of ester interchange catalysts for polyesters in an amount from 0.05 to 5 percent based on the phosphorous compound used, at a temperature from 150°C to 300°C with a dihydric alcohol of the formula

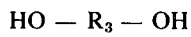

wherein R, $R_1$, $R_2$, and $R_3$ have the above significance.

3. Process as claimed in claim 2, wherein as catalyst manganese-II-acetate, zinc acetate or calcium acetate is used.

4. Process as claimed in claim 2, wherein the reaction is carried out at a temperature of between 200° and 300°C.

5. Process for the preparation of diphosphinic acid esters according to claim 1, wherein a diphosphinic acid ester of the formula

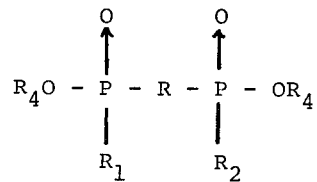

is reacted in the presence of basically reacting catalysts, in an amount from 0.05 to 5 percent based on the phosphous compound used, at a temperature from 150°C to 300°C with a diol of the formula

wherein R, $R_1$, $R_2$, and $R_3$ have the above significance and $R_4$ may be an alkyl group having up to 6 carbon atoms.

6. Process as claimed in claim 5, wherein the reaction is carried out in the presence of alkali metal or alkaline earth metal alcoholates.

7. Process as claimed in claim 5 wherein the reaction is carried out at a temperature of from 200° to 300°C.

* * * * *